G. H. Buckins,
Harness Trimming.
No. 81,336. Patented Aug. 25, 1868.
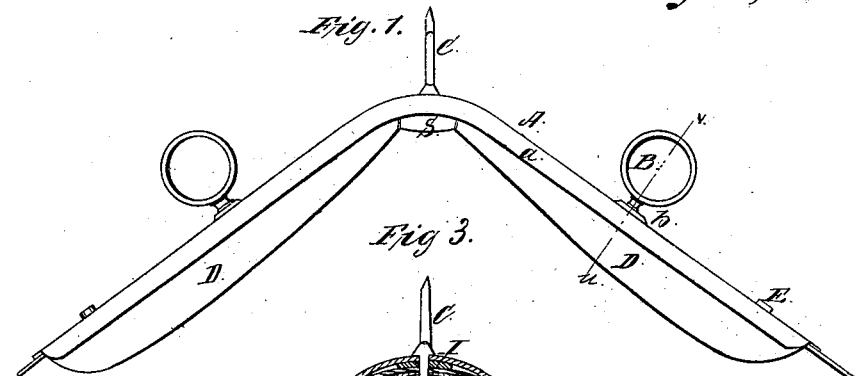
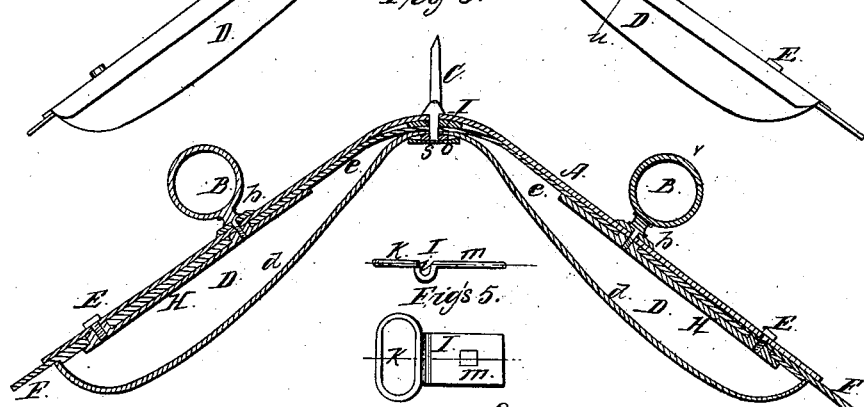
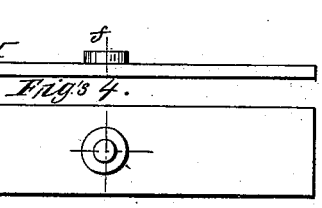
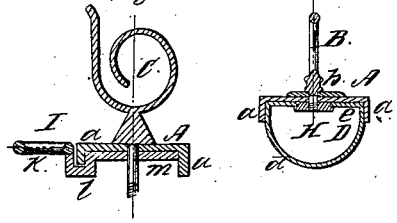
Witnesses:
A. W. Heldenbrand
Ed. A. Beebout
Inventor:
Geo. H. Buckins
By Jo. L. Abbott

United States Patent Office.

GEORGE H. BUCKIUS, OF CANTON, OHIO, ASSIGNOR TO HIMSELF, CORNELIUS AULTMAN, A. C. TONNER, AND P. S. SOWERS, OF THE SAME PLACE.

Letters Patent No. 81,336, dated August 25, 1868.

IMPROVEMENT IN HARNESS-SADDLE.

The Schedule referred to in these Letters Patent and making part of the same.

TO ALL WHOM IT MAY CONCERN:

Be it known that I, GEORGE H. BUCKIUS, of Canton, in the county of Stark, and State of Ohio, have invented an Improved Water-Proof Harness-Saddle; and I do hereby declare that the following is a full, clear, and exact description of my invention, reference being had to the accompanying drawings, forming a part of this specification, and to the letters of reference marked thereon, of which drawings—

Figure 1 is an elevation of my improved saddle.
Figure 2 is a plan of the same.
Figure 3 is a sectional view, showing the section made by plane $x\,y$ in plan.
Figures 4 are side view and plan of the saddle-pad piece.
Figures 5 are side view and plan of the crupper-piece.
Figure 6 is a sectional view, showing the mode of uniting the saddle-tree and crupper-piece.
Figure 7 is a sectional view, showing section made by plane $u\,v$ in fig. 1.

The nature of my invention consists in the peculiar mode of constructing the crupper-piece for a water-proof saddle, said piece being so constructed as that the inner portion sets up against the inner top surface of the tree, while the bent portion extends around the flange of the tree, and holds the crupper-loop up opposite the centre of the tree-flange, where it properly belongs, whereby I avoid any weakening of the tree by a slot in the flange, secure a firm and unyielding connection between the tree and crupper-piece, and prevent any water from running in at the side or top of the crupper-piece, where it would get into the pads, and rot and destroy them.

To enable others skilled in the art to make and use my invention, I will proceed to describe more fully its construction.

The tree A is made of iron, or any other suitable material, and consists of the plate A, of the form shown, with smooth or ornamental finished upper surface, and flanges $a\,a$, on each side, as shown in figs. 1, 6, and 7.

The plate A is free from any holes, excepting the holes for the terrets B B, water-hook C, and pad-screws E E, but as the water-hook C and pad-screws E E cover completely the holes in which they are placed, and the terret-washers $b\,b$, in combination with the terrets B B, cover the terret-holes, the top of the saddle, as well as the sides, is made quite water-proof.

The tree A being finished on its upper surface, no covering of leather or any other material is required.

The pads D are formed of the lower leather $d$, and upper leather $e$, the two being stitched together at the edges, as shown in fig. 7, and stuffed out in the proper shape with hair or other suitable material, in an ordinary manner.

They are made of the proper width to fit up between the flanges $a\,a$ of the tree, A, as shown in fig. 7.

The pad-plates H H, shown in detail in fig. 4, are placed just under the upper leather $e$, the raised nuts $h$ and $f$, for the pad-screws E and terrets B, projecting through holes in the upper leather $e$, as seen in figs. 3 and 7.

The raised nut $h$ is made of a height equal to two thicknesses of leather, or about twice as high as the nut $f$, so as to pass through a hole in the ends of the belly-bands F F, which ends are placed between the upper leather $e$ and the top plate A of the tree, as shown in fig. 3.

The terrets B B and pad-screws E E have screws cut on the lower ends of them, and corresponding threads are cut in the nuts $f$ and $h$, so that the tree and pads are firmly united by means of said terrets and pad-screws, which pass through holes in the tree-plate A, and screw into the nuts $f$ and $h$, as seen in fig. 3.

The crupper-piece I, shown in detail in fig. 5, consists of the ring or loop $k$, plate $m$, and bent portion $l$, connecting the loop and plate, and is cast in a single piece, as shown.

It is arranged in the tree A, as shown in fig. 6, the plate $m$ setting up against the under face of the plate A, and the bent portion $l$ fitting around the flange $a$, and is secured in that position by the bolt on the lower part of the water-hook C, which passes through a hole in the plate A, and a hole in the plate $m$ of the crupper-piece I, where it is secured by a nut, $c$, which bears on the lower face of plate $m$, or the bolt may be carried through the leathers e and d, and the nut c placed below them, as shown in fig. 3, the latter mode affording an additional connection between the pads D D and tree A.

When this last mode of arranging the nut c is used, a strip of leather, s, is placed under said nut, and its ends are tucked up between the flanges a a and the pad D, thus concealing the nut, as shown in fig. 1.

Having thus fully described my invention, what I claim as new, and desire to secure by Letters Patent, is—

The crupper-piece I, constructed as herein described, when used in combination with the tree A and water-hook C, substantially as and for the purpose specified.

As evidence that I claim the foregoing, I have hereunto set my hand in the presence of two witnesses, this 7th day of May, A. D. 1868.

GEO. H. BUCKIUS.

Witnesses:
JOB ABBOTT,
ED. N. BEEBOUT.